United States Patent [19]
Levinson et al.

[11] Patent Number: 4,550,975
[45] Date of Patent: Nov. 5, 1985

[54] OPTICAL COUPLING DEVICES

[75] Inventors: Frank H. Levinson, Bethlehem; Rudolph C. Schweizer, South Whitehall Township, Lehigh County, both of Pa.

[73] Assignee: AT&T Bell Laboratories, Murray Hill, N.J.

[21] Appl. No.: 373,135

[22] Filed: Apr. 29, 1982

[51] Int. Cl.[4] .............................................. G02B 5/14
[52] U.S. Cl. ................................ 350/96.18; 350/96.15
[58] Field of Search ............... 350/96.15, 96.17, 96.18, 350/96.20

[56] References Cited

U.S. PATENT DOCUMENTS

| | | | |
|---|---|---|---|
| 3,829,195 | 8/1974 | Rawson | 350/96.18 |
| 3,937,557 | 2/1976 | Milton | 350/96.18 |
| 4,213,677 | 7/1980 | Sugimoto et al. | 350/96.18 |
| 4,239,330 | 12/1980 | Ashkin et al. | 350/96.18 |
| 4,304,460 | 12/1981 | Tanaka et al. | 350/96.16 |
| 4,355,864 | 10/1982 | Soref | 350/96.18 |
| 4,362,359 | 12/1982 | Dammann et al. | 350/96.18 |
| 4,381,137 | 4/1983 | Berg et al. | 350/96.18 |

*Primary Examiner*—William L. Sikes
*Assistant Examiner*—Robert E. Wise
*Attorney, Agent, or Firm*—Lester H. Birnbaum

[57] ABSTRACT

An optical device which diverts light from one transmission element (e.g. 21) to another (e.g., 22, 23 and 24) and a method of manufacture are disclosed. The device includes a pair of focusing elements (10 and 11) such as graded index of refraction lenses separated by a pair of at least partially reflecting elements (12 and 13). Optical transmission elements are placed adjacent to the surfaces (17 and 20) of the focusing elements opposite the reflecting elements. The reflecting elements are placed at an angle to each other and the transmission elements positioned to achieve efficient light coupling. The reflecting elements can then be fastened to each other by an appropriate adhesive (14).

In specific embodiments, the device may function as a multiplexer/demultiplexer for light having three or more wavelengths, or as an asymmetric four-port coupler.

15 Claims, 6 Drawing Figures

OPTICAL COUPLING DEVICES

BACKGROUND OF THE INVENTION

This invention relates to optical devices, and in particular to devices which divert light among various transmission paths.

With the present and potential growth of lightwave communications systems, needs have arisen for a variety of optical components capable of diverting or splitting light signal onto different transmission paths. For example, where the signal includes more than one wavelength, a device capable of multiplexing and demultiplexing the constituent wavelengths is needed. Some proposals have been made to provide this function by a combination of focusing and reflecting elements. For example, U.S. Pat. No. 4,213,677 issued to Sugimoto et al teaches use of two graded index of refraction lenses with a filter element sandwiched between them. When light including two wavelengths is incident from a fiber on one surface of a lens, one wavelength will be reflected by the filter to another fiber on the same surface and the other wavelength will be transmitted to a fiber positioned on the opposite surface of the other lens. An array of fibers can be positioned on each surface to provide multiplexing/demultiplexing of several different signals comprising two wavelengths. U.S. Pat. No. 4,304,460 issued to Tanaka shows a focusing rod lens with an array of optical waveguides on one surface and a tilted, rotatable reflection means near the opposite surface. Between the lens and reflection means is a tilted, rotatable filter which reflects a first wavelength and transmits a second wavelength. By rotating the filter and reflection means separately to a desired location, the two wavelengths from a single waveguide can be made incident on two different waveguides of the array. As another example, the patent suggests that an additional focusing lens be placed behind the filter so that while one wavelength is reflected back to a waveguide, the second wavelength can be transmitted to a transducer which controls the rotation of the filter.

The above-described references are primarily concerned with signals including only two wavelengths. However, in order to increase the capacity of future systems, three or more wavelengths will be desirable. This need creates special requirements for optical components in minimizing losses and properly aligning the various wavelength components with their appropriate fibers. One proposal for a four-channel multiplexer/demultiplexer is found in U.S. patent application Ser. No. 246,106, filed Mar. 20, 1981, now U.S. Pat. No. 4,424,474, and assigned to the present assignee. There, a plurality of filters is provided at one end of a graded index of refraction lens and placed at various angles so that each wavelength component will be reflected by a different filter to a different fiber in an array positioned at the other end of the lens. It is suggested that the angular disposition of the filters can be achieved by means of transparent wedges cemented between the filters. A device of this type has definite advantages, but also suffers from the fact that a significant loss may result each time a constituent wavelength traverses one of the filters. Thus, a constituent wavelength reflected by one of the back filters may become too attenuated to provide a good signal. Further, in the above proposals where filter elements are positioned at an angle to each other, it appears that the angle must be preset within tight tolerances. It may be more advantageous if the angles could be adjusted during manufacture to achieve maximum alignment of the light with its appropriate transmission fibers.

It is also desirable to divert light to different transmission paths when the signal is composed of one wavelength. For example, in data communication systems, often a single central processing unit will service several terminals. Each such terminal should have the capability of extracting a portion of the signal while the remainder of the signal is available to other terminals. Also, each terminal should be able to transmit a signal onto the same line without interfering with its own receiver. Thus, what is needed at each terminal is an asymmetric four-port optical coupler where at least three ports could be operational at one time while the local transmitter and receiver ports are optically isolated. U.S. Pat. No. 4,213,677, cited above, describes a four-port coupler employing a pair of focusing elements with a partially reflecting element sandwiched therebetween and two fibers located on each opposing surface of the focusing elements. Incoming light from one of the fibers will be partially reflected back to the other fiber on the same surface and partially transmitted to one of the fibers at the other surface. The coupler is therefore symmetrical, and any light from a local transmitting port will also be incident on a receiver port.

It is therefore desirable to provide an optical device for diverting light among different transmission paths which in one form is capable of multiplexing and demultiplexing a signal of three or more wavelengths with high efficiency. It is also desirable in such devices to include some means of monitoring the transmission of each constituent wavelength. It is further desirable to provide an optical device for diverting light among different transmission paths which in another form is capable of coupling light among at least three ports simultaneously and providing optical isolation between one of these ports and an additional port to produce an asymmetric four-port coupler.

It is further desirable to manufacture such devices to permit maximum coupling efficiency between the transmission elements for each device.

SUMMARY OF THE INVENTION

These and other objects are achieved in accordance with the invention which is a device for diverting light from one transmission path to another, and a method of fabricating such a device.

In its device aspects, the invention includes first and second light focusing elements positioned with two surfaces in a spaced relationship and a pair of at least partially reflecting elements positioned in the space between the focusing elements. The reflecting elements have their optical axes at an angle to each other. A plurality of light transmission elements is coupled to a surface of the first light focusing element opposite to the reflecting elements, and at least one transmission element is coupled to a surface of the second focusing element which is also opposite to the reflecting elements. The position of the transmission elements and the angle of the reflecting elements is such that light incident on each reflecting element can be diverted to a different transmission element while at least a portion of the light is transmitted from a transmission element on the surface of the first focusing element to a transmission element on the opposite surface of the second focusing element.

In its method aspects, the invention includes positioning a pair of at least partially reflecting elements between a pair of focusing elements by means of a curable adhesive, and positioning a plurality of light transmission elements at the surfaces of the light focusing elements opposite to the reflecting elements. The angle between the axes of the reflecting elements and the position of the transmission elements are adjusted to maximize coupling between the transmission elements, and the adhesive is cured to fix the angle between the reflecting elements.

BRIEF DESCRIPTION OF THE DRAWING

These and other features of the invention are delineated in detail in the following description. In the drawing.

It should be appreciated that for purposes of illustration these figures are not drawn to scale.

DETAILED DESCRIPTION

The principles of the present invention will first be described with reference to the embodiment illustrated schematically in FIG. 1. The device includes two light focusing elements, 10 and 11, which in this example are graded index of refraction lenses in the form of cylinders. As known in the art, the index of refraction of such elements decreases radially from the optical axes, 15 and 16, to provide focusing of light incident on the end surfaces. The length of each element was approximately ¼ pitch, which in this example was approximately 4.7 mm. The diameter of the elements was approximately 1.8 mm. Of course, these dimensions can be changed according to particular needs.

Each focusing element, 10 and 11, includes two end faces, 17, 18 and 19, 20. One end face of each element, 18 and 19, is positioned in a closely spaced relationship for light coupling. Disposed between these end faces was a pair of partially reflecting elements, 12 and 13. In this embodiment, each such element was a filter which reflects a particular one of the components of incident light and transmits all other components. In this example, filters 12 and 13 were commercially available interference filters comprising approximately 35 layers of alternating high and low index of refraction materials. Filter 12 reflected wavelengths between approximately 0.700 and 0.850 $\mu$m to reflect the $\lambda_1$ component and filter 13 reflected wavelengths from approximately 0.750 to 1.0 $\mu$m to reflect the $\lambda_2$ component. The filters were bonded to respective end faces 18 and 19 of the focusing elements by means of a thermally curing transparent epoxy cement. (In this example, the filters were deposited onto separate glass substrates which were then bonded to respective end faces 18 and 19 of the focusing elements by means of the epoxy cement. The filter or partially reflecting elements could also be coated directly onto the end faces 18 and 19 of the focusing elements.)

Figure 6:
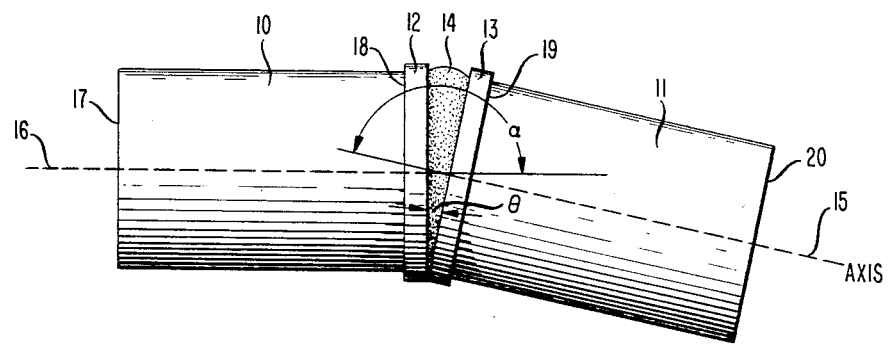
FIG. 6 is a partly schematic front view of a basic form of the devices of FIGS. 1-3 showing certain features of the invention.

As illustrated more clearly in FIG. 6, the filters were positioned so that their faces were at a small angle ($\theta$) to each other. More generally, it is necessary that the optical axes of the reflecting elements (which in this case coincide with the axes of the focusing elements) be non-collinear, i.e., make an angle $\alpha$ with respect to each other whose absolute value is less than 180°. It will be understood from FIG. 6 that the angle $\alpha$ between the optical axes is the obtuse angle formed by considering both axes to be directed either toward or away from each other. In this example, the angle $\alpha$ was approximately 178.7°, but as explained below, this can be adjusted for each device for maximum coupling efficiency. It is recommended for these lenses, however, that the absolute value of the angle be no less than 170° and no greater than 179.5°. The angle between the reflecting elements was fixed by an appropriate adhesive, 14, which in this example was a commercially available ultraviolet curable optical cement which is sold by Norland Products Incorporated, New Brunswick, N.J. under the designation UV61.

On one of the focusing elements referring back to FIG. 1, three optical transmission elements, 21, 22, 23, were bonded to the end face, 17, opposite to the reflecting element using the same optical cement used to bond the reflecting elements. Similarly, on the opposite surface, 20, of the other focusing element, a fourth optical transmission element, 24, was bonded. Typically, these transmission elements are standard optical fibers. It should be understood in the context of this application that "transmission element" is intended to include any element used in optical transmission, including LEDs and optical detectors which might be bonded directly to the end surfaces of the device. In this particular example, the elements were commercially available fibers having 125 $\mu$m outer diameters and 50 $\mu$m core diameters. The positions of the fibers on the end surfaces were chosen to provide maximum light coupling efficiency among the fibers in accordance with the function of the device.

Figure 1:
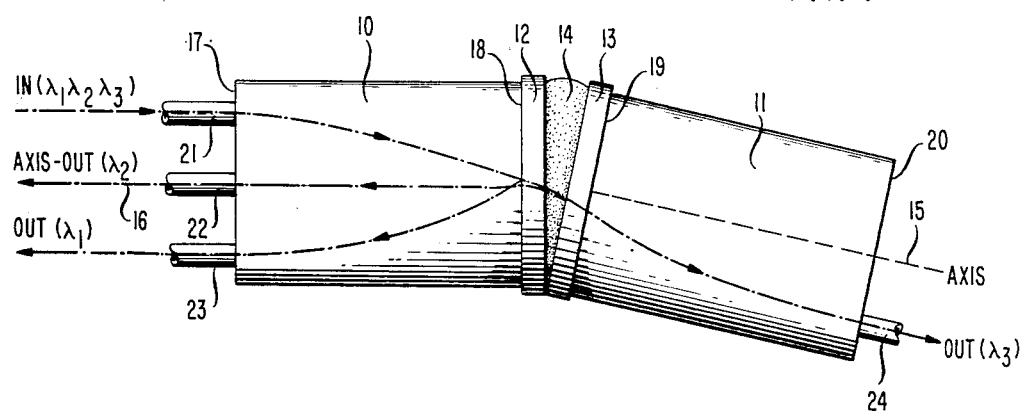
FIG. 1 is a partly schematic front view of a device in accordance with one embodiment of the invention.

The operation of the device in this example is illustrated schematically in FIG. 1 by lines and arrows which approximate the paths of central light rays through the device. This particular device is shown functioning as a demultiplexer. However, it is apparent that the device may also function as a multiplexer by just reversing the path of the light rays. More specifically, light from fiber 21 which includes constituent wavelengths $\lambda_1$, $\lambda_2$, and $\lambda_3$ is transmitted and focused by focusing element 10 so as to be incident on filter 12 at approximately the optical axis. A constituent wavelength ($\lambda_1$) is reflected by filter 12 back to the end face 17 where it is incident on fiber 23. The remaining wavelengths are transmitted through filter 12 and incident on filter 13 where a second constituent wavelength, $\lambda_2$, is reflected back into element 10. The angle of filter 13 with respect to filter 12 and element 10 is such that this constituent wavelength will be made incident on fiber 22 at end face 17. The third constituent wavelength, $\lambda_3$, is transmitted through filter 13 and focusing element 11 to fiber 24 located on end face 20. The three wavelengths are thus demultiplexed without any constituent having to pass through more than two filters. In this particular example, $\lambda_1$ was 0.825 $\mu$m, $\lambda_2$ was 0.875 $\mu$m and $\lambda_3$ was 1.3 μm. Losses for the individual wavelengths were just 0.3, 1.4, and 0.9 dB for the 0.825, 0.875, and 1.30 μm light, respectively. The 0.825 and 0.875 μm wavelengths were provided by standard AlGaAs lasers, while the 1.30 μm wavelength was provided by a standard InGaAsP LED.

A further advantage of the invention lies in the ability to assemble devices with a high coupling efficiency for each device. In a typical manufacturing sequence, after the filters 12 and 13 were cemented to the end faces 18 and 19 of the focusing elements 10 and 11, respectively, fibers 21, 22, 23 were positioned as an array at face 17. While light having wavelength $\lambda_1$ was transmitted through fiber 21, the array was placed in a position so that fiber 23 received the optimum light reflected from filter 12 and then the array was cemented into place. The focusing element 11 with filter 13 cemented to end surface 19 was then brought into closely spaced relationship with element 10 and curable adhesive 14 provided in the space between the filters. While the adhesive was still in its uncured state, the angle θ between filters 12 and 13 was adjusted while transmitting light of wavelength $\lambda_2$ through fiber 21 and reflecting it off filter 13 until optimal coupling of the light into fiber 22 was achieved. After these adjustments, the adhesive was cured by ultraviolet light, thus fixing the angle θ. Finally, fiber 24 was positioned on the end face 20 of element 11 opposite to the filter elements, while light of wavelength $\lambda_3$ was transmitted through the device. When optimum coupling was achieved, fiber 24 was cemented into place. All fiber alignments were done with standard apparatus such as commercially available micropositioners.

Figure 5:
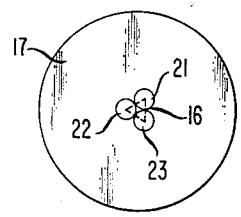
FIG. 5 is a side view of a device in accordance with a still further embodiment of the invention.

Thus, it will be noted that the method in accordance with one aspect of the invention permits maximum coupling efficiency for each device by adjustment of angle and fiber position rather than requiring preset conditions which will vary efficiency from device to device. It should be noted that although fibers 21-23 appear to form a straight line and distances between fibers are exaggerated, most efficient coupling can be achieved by using a triangular array such as that shown in the end view of FIG. 5. Elements corresponding to those of FIG. 1 are similarly numbered. The cores of fibers 21 and 23 are preferably approximately equidistant from the axis 16. It will also be appreciated that such an array can be easily positioned on the end surface by inserting the fibers in standard capillary tubes (not shown).

It should also be realized that adhesive 14 can be any optical adhesive where the onset of curing can be controlled, as by application of heat or UV light, and there is low shrinkage (preferably less than 5 percent) during curing. An optical adhesive is considered to be any adhesive which is transparent and has an index of refraction in the range of approximately 1.4–1.6. One further example of a useful adhesive is a thermally curing epoxy comprising a mixture of polyoxypropylenetriamine as a curing agent and a resin of diglycidyl ether bisphenol A in an amount of approximately 35–40:100.

Figure 2:
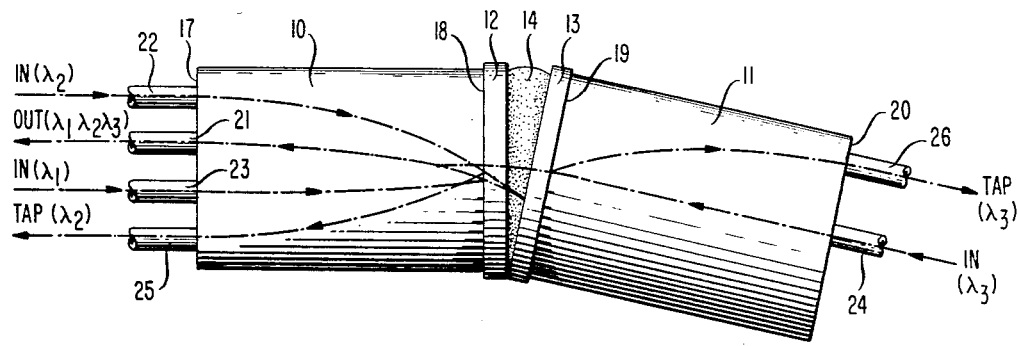
FIG. 2 is a partly schematic front view of a device in accordance with a further embodiment of the invention.

Often, it is desirable to provide taps in fiber optic communication systems to check if the appropriate signals are being transmitted. Usually, these take the form of splices in the optical fibers themselves which are difficult to obtain without damage to the fibers. As illustrated in FIG. 2, one of the advantages of the present device is that it permits tapping of a part of the signal without damage to the fibers. The device shown is a multiplexer, with elements similar to those of FIG. 1 being similarly numbered. In this embodiment, in addition to the transmission elements already described, light transmission element 25 was coupled to the end face 17 of focusing element 10, and light transmission element 26 was coupled to face 20 of focusing element 11. The device makes use of the portion of light which would otherwise be lost (i.e., reflected) when light is primarily transmitted through a filter element. Thus, in operation, light of wavelength $\lambda_1$ from fiber 23 is reflected by filter 12 onto common output fiber 21. Light having a wavelength $\lambda_2$ from fiber 22 is primarily transmitted through filter 12 and reflected by filter 13 onto output fiber 21. However, a small portion of this light (approximately 10 percent) is also reflected by filter 12 due to fresnel reflections. An optical transmission element, 25, is therefore positioned on face 17 in order to receive this reflected light. By providing a light detector (not shown) coupled to the transmission element, the $\lambda_2$ signal can be monitored. Similarly, light of wavelength $\lambda_3$ from element 24 is primarily transmitted through both filters 12 and 13 onto output fiber 21, but a small portion is reflected by filter 13 and is incident on transmission element 26 coupled to face 20 for monitoring the $\lambda_3$ signal. (The portion reflected by filter 12 could also be used for the tap if desired.) In this particular example, $\lambda_1$ was 1.3 μm, $\lambda_2$ was 0.825 μm, and $\lambda_3$ was 0.875 μm. Since $\lambda_1$ was provided by an LED which is much more reliable than laser light constituting the other components, monitoring of the $\lambda_1$ signal was not necessary.

Again, it will be appreciated that although fibers 21, 22, 23, and 25 are shown in a straight line, most efficient coupling may be achieved by placing the fibers in an array where each core is positioned at the corner of a parallelogram such as a square or rectangle.

Figure 3:
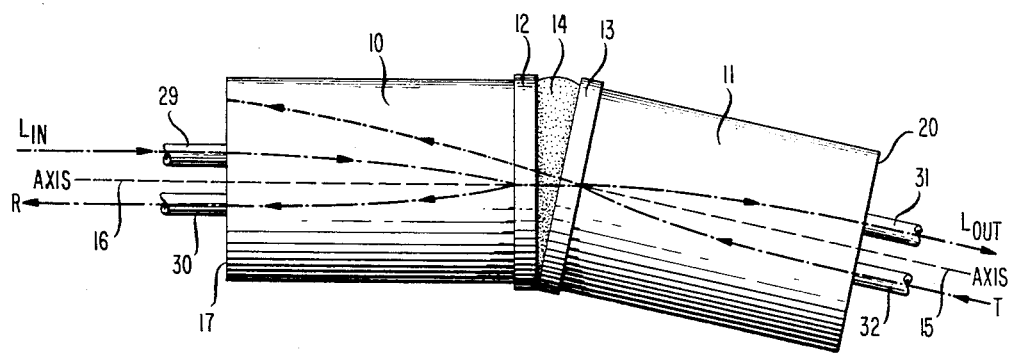
FIG. 3 is a partly schematic front view of a device in accordance with a still further embodiment of the invention.

FIG. 3 illustrates a further embodiment of the invention performing the function of a four-port coupler. Again, the focusing elements were ¼ pitch graded index of refraction lenses with partially reflecting elements 12 and 13, which in this example were coated onto the end faces, 18 and 19, of the focusing elements. In this example, the reflecting elements were commercially available dielectric beam splitters. An appropriate angle was maintained between the reflecting elements by adhesive 14. In this example, the angle α between the optical axes of the reflecting elements was 178.7°. A pair of light transmission elements (29, 30 and 31, 32) were positioned on the focusing elements' end faces (17 and 20, respectively) opposite to the reflecting elements. Here, each element of the pair was positioned equidistant from the axis (16 and 15) of the focusing element to which it was coupled. However, the distance between fibers in a pair need not be equal to the distance between fibers of the other pair.

In operation, light of a single wavelength at the port designated $L_{in}$ was transmitted through fiber 29 onto focusing element 10 where it was focused onto filter 12. A small portion of the light (approximately 5 percent) was reflected back to end face 17 and incident on fiber 30 which was coupled to a local receiver (the port therefore being designated by R). Most of the light $L_{in}$ was transmitted through both filters 12 and 13. The angle between the filters and the position of fiber 31 were chosen so that the transmitted light would be properly refracted and focused onto fiber 31 at end face 20 of element 11. This portion of the light thus constituted a continuation of the transmitted signal to other terminals (the port being designated $L_{out}$). At the same time, light from a local transmitter (port T) incident on face 20 through fiber 32 was made incident on fiber 31 as a result of reflection from filter 13. (Although in this example element 13 reflected approximately the same proportion of light as element 12, this need not be the case.) A portion of this light was also transmitted through filters 13 and 12, but due to the angle between filters, such light was not incident on any fibers as shown by the shorter dashed line in element 10. Thus, the device provides an asymmetric four-port coupler which gives the capability of receiving from and transmitting onto a main transmission path ($L_{in} \rightarrow L_{out}$) while at the same time optically isolating the local transmitter port (T) from the local receiver port (R). In this particular example, with a wavelength of 0.875 μm, the loss for $L_{in} \rightarrow L_{out}$ was 1.2 dB, the loss from $T \rightarrow L_{out}$ was 11.5 dB, the loss from $L_{in} \rightarrow R$ was 11.3 dB, and the loss of $T \rightarrow R$ was greater than 40 dB. In order to optically isolate transmitter and receiver, a loss of at least 25 dB is recommended. The insertion loss among the various ports will, of course, be dependent upon the reflectivity of the filter elements 12 and 13. In general, it is recommended that the losses be a maximum of 6 dB for $L_{in} \rightarrow L_{out}$, 13 db for $L_{in} \rightarrow R$, and 13 dB for $T \rightarrow L_{out}$.

The manner of assembly of the device in FIG. 3 is similar to that of FIG. 1. Thus the positions of fibers 29 and 30 and fibers 31 and 32 were adjusted for maximum coupling between the fiber pairs. The separate assemblies were then brought into close proximity and the joint filled with the cement. The angle between elements 12 and 13 was then adjusted for maximum coupling from fibers 29 to 31. Finally, lack of coupling between fibers 32 and 30 was tested, and the angle between the filters was then fixed by curing adhesive 14 as before.

Figure 4:
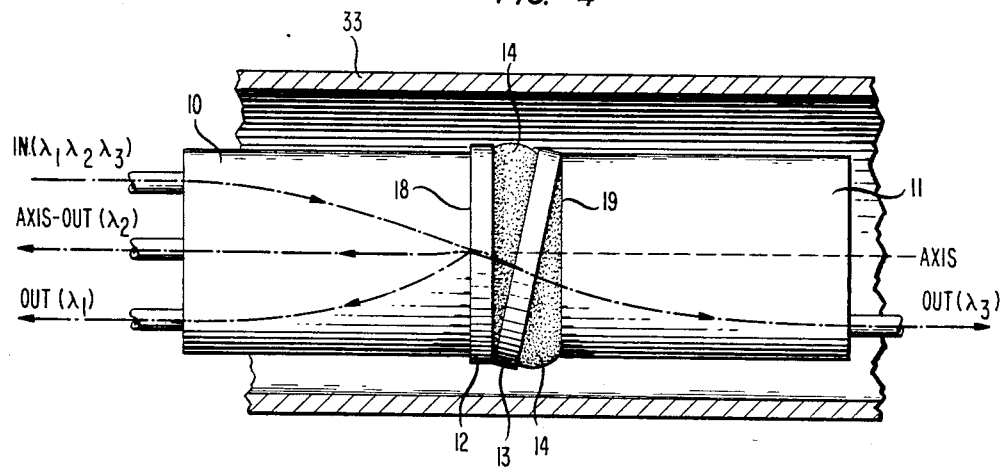
FIG. 4 is a partly schematic front view of a device in accordance with a still further embodiment of the invention.

FIG. 4 illustrates a further embodiment of the invention which is similar to the device shown in FIG. 1. Here, however, the focusing elements 10 and 11 are kept colinear by not cementing the filter 13 to the end face 19 of focusing element 11. Rather, the element 13 is fastened to element 11 by the same adhesive 14 used to fasten 12 and 13 together. It should be appreciated that filter 12 may also be separated from the end face 18 of focusing element 10. The advantage of perfectly colinear structures is that they can be more easily mounted in a tubular hermetic enclosure, a part of which is illustrated in cross-section as 33. It should be realized, however, that the other structures previously described need not depart so far from colinearity as to present a problem for such hermetic enclosures. In this regard, it is recommended that the absolute value of α be at least 170°.

Various additional modifications will become apparent to those skilled in the art. All such variations which basically rely on the teachings through which the invention has advanced the art are properly considered within the spirit and scope of the invention.

What is claimed is:

1. An optical device for diverting light from one transmission element to another comprising:
   first and second light focusing elements each having two surfaces, with one surface of each element positioned in a spaced relationship;
   first and second partially reflecting elements positioned in the space between the focusing elements and having their optical axes at an angle other than 180° to each other; and
   a plurality of light transmission elements coupled to a surface of the first light focusing element opposite to said reflecting elements and at least one transmission element coupled to a surface of the second light focusing element opposite to said reflecting elements, the position of the transmission elements, and the angle of the reflecting elements being such that light incident on each reflecting element is coupled between different transmission elements while at least a portion of the light is transmitted from a transmission element on the surface of the first focusing element to a transmission element on the opposite surface of the second focusing element.

2. The device according to claim 1 wherein the light focusing elements are graded index of refraction lenses.

3. The device according to claim 1 wherein the partially reflecting elements are filters each of which reflects incident light having a different predetermined wavelength and transmits the major portion of all other incident light.

4. The device according to claim 3 wherein a first transmission element coupled to the first focusing element is adapted to transmit light having at least three wavelengths, a second transmission element coupled to the first focusing element is adapted to transmit a first one of said wavelength reflected by the first filter, a third transmission element also coupled to the first focusing element is adapted to transmit a second one of said wavelengths reflected by the second filter, and a fourth transmission element coupled to the second focusing element is adapted to transmit the third wavelength.

5. The device according to claim 4 further comprising a fifth transmission element coupled to the surface of the first focusing element opposite the filter elements and adapted to receive light of the second wavelength which is reflected by the first filter element, and a sixth transmission element coupled to the surface of the second focusing element opposite the filter elements and adapted to receive light of the third wavelength reflected by one of the filter elements.

6. The device according to claim 1 wherein the angle between the optical axes of the reflecting elements has an absolute value in the range 170°–179.5°.

7. The device according to claim 1 wherein coupled to the surface of the first focusing element opposite to the reflecting elements are at least first and second transmission elements and coupled to the surface of the second focusing element opposite the reflecting elements are at least third and fourth transmission elements, the second transmission element being adapted to receive light from the first transmission element reflected from the first reflecting element, the fourth transmission element being adapted to receive light from the third transmission element which is reflected from the second reflecting element, the fourth transmission element being also adapted to receive light from the first transmission element, and the second transmission element being optically isolated from the light from the third transmission element.

8. The device according to claim 1 wherein the angle between the reflecting elements is fixed by a curable adhesive.

9. An optical multiplexing/demultiplexing device comprising:

first and second graded index of refraction lenses each having opposing end surfaces with one end surface of each lens being in a spaced relationship;

first and second filter elements disposed in the space between the lenses with their optical axes disposed at an angle with an absolute value in the range 170°–179.5°, each of said elements being adapted to reflect incident light having a different predetermined wavelength and transmit the major portion of all other incident light;

a curable adhesive disposed between the filter elements to maintain said angle;

at least three optical transmission elements coupled to the surface of the first lens opposite to the filter elements, one of said transmission elements being adapted to transmit light having at least three wavelengths and the other two transmission elements each being adapted to transmit light of a different one of the wavelengths; and at least one optical transmission element coupled to the surface of the second lens opposite to the filter elements and adapted to transmit light of the third wavelength.

10. An optical four-port coupling device comprising:

first and second graded index of refraction lenses each having opposing end surfaces with one end surface of each lens being in a spaced relationship;

first and second partially reflecting elements disposed in the space between the lenses with their optical axes disposed at an angle with an absolute value in the range 170°–179.5°;

a curable adhesive disposed between the reflecting elements to maintain said angle;

first and second optical transmission elements coupled to the surface of the first lens opposite to the reflecting elements with the second transmission element being adapted to receive light from the first transmission element which is reflected from the first reflecting element; and third and fourth optical transmission elements coupled to the surface of the second lens opposite to the reflecting elements, with the third transmission element being adapted to receive light from the fourth transmission element which is reflected from the second filter element and also to receive light from the first transmission element which is transmitted through the two reflecting elements, the second transmission element being optically isolated from light from the fourth transmission element which is transmitted through the two reflecting elements.

11. A method of fabricating an optical device for diverting light from one transmission element to another comprising the steps of:

positioning a pair of at least partially reflecting elements between first and second focusing elements, each having opposing end surfaces, by means of a curable adhesive;

positioning a plurality of light transmission elements at the surfaces of the focusing elements opposite to the reflecting elements;

adjusting the angle between the optical axes of the reflecting elements and positioning the transmission elements in order to maximize coupling between the transmission elements;

and allowing the adhesive to cure in order to fix the angle between the reflecting elements.

12. The method according to claim 11 wherein the curable adhesive comprises an optical adhesive which is cured by application of heat or UV light and shrinks no more than 5 percent during curing.

13. The method according to claim 11 wherein the reflecting elements are each contiguous to one of the faces of the focusing elements.

14. The method according to claim 11 wherein the angle between reflecting elements and the position of the optical transmission elements are adjusted so that two transmission elements on the surface of the first focusing element each receive light of a different wavelength reflected by a different reflecting element and a transmission element on the surface of the second focusing element opposite the reflecting elements receives light of a third wavelength transmitted through the reflecting elements.

15. The method according to claim 11 wherein the angle between reflecting elements and the position of the optical transmission elements are adjusted so that a transmission element coupled to a surface of the first focusing element opposite the reflecting elements receives light from another transmission element coupled to the same surface, a transmission element coupled to the surface of the second focusing element receives light from another transmission element coupled to the same surface as well as light from a transmission element coupled to the surface of the first focusing element, and the other transmission element coupled to the first focusing element is optically isolated from the transmission elements coupled to the surface of the second focusing element.

* * * * *